Oct. 15, 1929.  R. V. ROONEY  1,731,986

CURTAIN FASTENER

Filed Sept. 19, 1928

INVENTOR.
Rose V. Rooney
BY
ATTORNEY.

Patented Oct. 15, 1929

1,731,986

UNITED STATES PATENT OFFICE

ROSE V. ROONEY, OF DETROIT, MICHIGAN

CURTAIN FASTENER

Application filed September 19, 1928. Serial No. 306,794.

My invention relates to a new and useful improvement in a curtain fastener adapted for attachment to a window sill or other suitable support to engage a curtain at various positions for retaining the same in desired positions.

It is an object of the present invention to provide a fastener of this class which will be simple in structure, economical of manufacture and highly efficient in use.

Another object of the invention is the provision of a fastener of this class which may be easily and quickly attached to the supporting object.

Another object of the invention is the provision of a curtain engaging member which will securely engage and lock the curtain in engagement therewith without damaging the curtain itself.

Other objects will appear hereinafter.

The invention consists in the combination and arrangement of parts hereinafter described and claimed.

The invention will be best understood by a reference to the accompanying drawings which form a part of this specification and in which Fig. 1 is a perspective view of the invention showing it mounted on a support.

The invention comprises a clamping body which is preferably made from stamping out of some suitable resilient material and comprises a back 7 and an angularly turned top 8, the back 7 being forwardly turned to provide the curved portion 9 having its edge 10 again curved.

Figure 1:
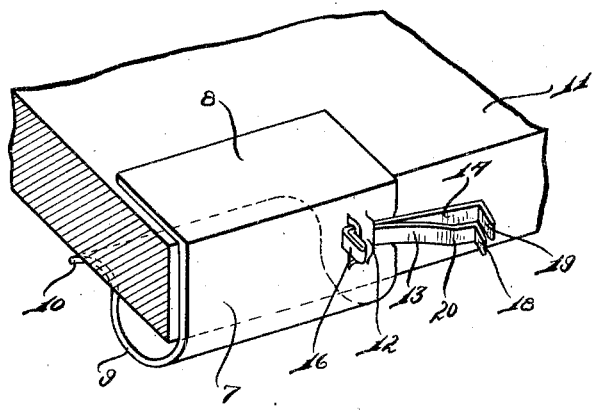
Figure 3:
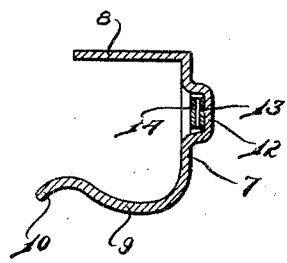
Fig. 3 is a sectional view taken on line 3—3 of Fig. 2.
Figure 2:
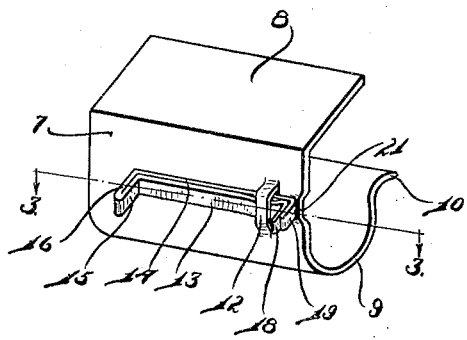
Fig. 2 is a perspective view of the invention showing the fastener in closed position.
Figure 4:
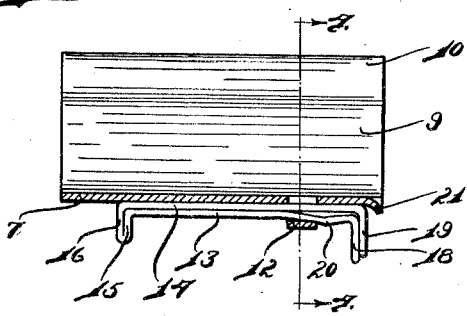
Fig. 4 is a sectional view taken on line 4—4 of Fig. 3.

In use this fastener is snapped upon the window sill 11 or other suitable support at a desired location so that the curtain hung before the window may be engaged by the fastener. Punched outwardly from the back 7 is a strip 12 to provide an eyelet for the reception of the fastening member. This fastening member is made preferably from metal and comprises the elongated arms 13 and 14, the ends 15 and 16 of which are laterally offset to provide a suitable handhold. The free ends 18 and 19 are laterally turned after engagement of the arms 13 and 14 in the eyelet formed by the strip 12. The arm 13 is bulged as at 20 so as to resist sliding movement of the arm 13 relatively to the strip 12 in one direction. This arm 13, however, is sufficiently resilient that the bulge 20 may be compressed sufficiently to permit a sliding of the arms 13 and 14 into the position shown in Fig. 2. When slid into this position the angularly turned ends 18 and 19 are brought into close engagement so that a layer of curtain placed therebetween will be securely clamped thereby. The back 7 is punched outwardly as at 21 to provide a sort of rise over which the arms 13 and 14 must pass in moving from the position shown in Fig. 1 to the position shown in Fig. 2. As shown in Fig. 2 this rise 21 serves to prevent the forward sliding of the arms 13 and 14 so that the bulge 20 will be retained in position beneath the strip 12 and under pressure.

A curtain fastener constructed in this manner is one which is most effective in clamping the curtain and retaining it in position, the grip being a positive and tight one, while at the same time, there is no engaging members to penetrate or tear the curtain.

By forming the back 7 at substantially right angles to the top 8 the back 7 will serve to engage the outer edge of the window sill 11 and prevent twisting of the device when the angularly turned portions 15 and 16 are engaged for sliding the arms 13 and 14 relatively to the strip 12.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A curtain fastener of the class described comprising a supporting member; a loop on said supporting member; a securing member slidably mounted in said loop; and a pair of cooperating clamping members on said securing member movable into clamping relation upon movement to one position in said loop.

2. A curtain fastener of the class described comprising a supporting member; a loop on said supporting member; a fastener slidably mounted in said loop and comprising a pair of cooperating doubled over gripping portions, the ends of said gripping portions being angularly turned and extended parallel to each other and adapted upon slidable movement of said fastener in said loop for engaging each other.

3. A fastener of the class described comprising a supporting member; a loop punched from said supporting member; a resilient fastener slidably mounted in said loop and comprising a pair of elongated arms, each having their ends angularly turned movable into engagement with each other upon movement to a predetermined position in said loop.

4. A fastener of the class described comprising a resilient supporting member; a loop punched from said supporting member; a fastener comprising a strip of metal doubled upon itself and angularly turned at the doubled over end and slidably projected through said loop, the ends of said doubled over portions being normally in spaced relation to each other and being angularly turned parallel to each other, the movement of said fastener to a predetermined position in said loop, moving said ends into engagement with each other.

In testimony whereof I have signed the foregoing specification.

ROSE V. ROONEY.